United States Patent
Al-Zahrani

(10) Patent No.: US 12,234,794 B2
(45) Date of Patent: Feb. 25, 2025

(54) JET FUEL FILTER ASSEMBLY

(71) Applicant: SAUDI ARABIAN OIL COMPANY, Dhahran (SA)

(72) Inventor: Abdullah Mohammed Al-Zahrani, Jeddah (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 155 days.

(21) Appl. No.: 17/833,517

(22) Filed: Jun. 6, 2022

(65) Prior Publication Data
US 2023/0392568 A1  Dec. 7, 2023

(51) Int. Cl.
*F02M 29/06* (2006.01)
*B01D 35/30* (2006.01)

(52) U.S. Cl.
CPC ............ *F02M 29/06* (2013.01); *B01D 35/30* (2013.01)

(58) Field of Classification Search
CPC ................................ F02M 29/06; B01D 35/30
See application file for complete search history.

(56) References Cited

U.S. PATENT DOCUMENTS

| | | | | |
|---|---|---|---|---|
| 3,568,835 A * | 3/1971 | Hansen | ................. | B01D 21/26 210/123 |
| 7,267,098 B1 * | 9/2007 | Tasanont | ............... | F15D 1/0005 123/590 |
| 7,543,561 B2 | 6/2009 | Shibata et al. | | |
| 9,228,542 B2 | 1/2016 | Anderson | | |
| 10,532,296 B1 * | 1/2020 | Keenan | ................... | F02M 37/22 |
| 2007/0169764 A1 * | 7/2007 | Lo | ........................... | F02M 29/06 123/590 |
| 2008/0060985 A1 * | 3/2008 | Carew | .................. | B01D 29/925 210/497.1 |
| 2009/0050105 A1 * | 2/2009 | Shibata | ................ | F02M 35/022 123/306 |
| 2014/0102984 A1 * | 4/2014 | Harp | .................. | B01D 67/0027 156/60 |
| 2014/0338781 A1 * | 11/2014 | Anderson | ............. | F02M 29/06 138/177 |

(Continued)

FOREIGN PATENT DOCUMENTS

| | | | | |
|---|---|---|---|---|
| DE | 29610837 U1 | 8/1996 | | |
| GB | 2410296 A | * 7/2005 | ............. | F02B 31/04 |
| KR | 200423824 | * 8/2006 | | |

OTHER PUBLICATIONS

"Filtration and Condition Monitoring Solutions", Parker Velcon Solutions for Jet Fuel Handling, Parker Hannifin, Jan. 2022, p. 1-3 (Year: 2022).*

(Continued)

*Primary Examiner* — Jonathan M Peo
(74) *Attorney, Agent, or Firm* — Osha Bergman Watanabe & Burton LLP

(57) ABSTRACT

Described is a jet fuel filter assembly. The jet fuel filter assembly includes an elongated filter cartridge and a filter element formed to fit within the bottom of the filter cartridge. The filter element consists of a hollow tube member and flow vanes extending from an interior wall of the hollow tube member toward a center of the hollow tube member. The flow vanes redirect jet fuel entering the filter cartridge in a helical path, thereby preventing premature rupturing of the filter cartridge due to jet fuel surges.

16 Claims, 3 Drawing Sheets

(56) References Cited

U.S. PATENT DOCUMENTS

2015/0027942 A1* 1/2015 Chen ................... B01D 17/02
210/323.2
2019/0009205 A1* 1/2019 Oberli ............... B01D 46/0045

OTHER PUBLICATIONS

"Fuel Filters" JET Performance Products, Jan. 2022, p. 1-7 (Year: 2022).*
"Aviation, Settling the Standard in Aviation Filtration", Facet Filtration Group, Jan. 7, 2020, p. 1-83 (Year: 2020).*
"Filtration and Condition Monitoring Solutions", Parker Velcon Solutions for Jet Fuel Handling, Parker Hannifin. Jan. 2022, pp. 1-3, [3 Pages].
"Fuel Filters", JET Performance Products. Jan. 2022, pp. 1-7, [7 Pages].
"Aviation, Setting the Standard in Aviation Filtration", Facet Filtration Group. Jan. 7, 2020, pp. 1-83, [83 Pages].

* cited by examiner

JET FUEL FILTER ASSEMBLY

BACKGROUND

Jet fuel typically travels by pipeline from a refinery to storage terminals. The fuel may then be further transported by pipeline to airports or military bases for distribution to aircraft via ground vehicle or an underground system that supplies fuel to the aircraft. At the discharge pipelines, which are the exit points to airports or military bases, there are multiple vessels which hold jet fuel filter cartridges. One function of a jet fuel filter cartridge is to separate water from the jet fuel in accordance with international quality specifications. Jet fuel filter cartridges are typically constructed from materials such as felts, woven yarns, and cellulose.

In use, each filter is placed inside a vessel such that the bottom of the filter is proximate the bottom of the vessel. As jet fuel enters the bottom of the vessel, and thus the bottom of a filter cartridge, it is common that the filter cartridge cannot withstand the jet fuel surge and ruptures prematurely. Thus, a continuing need exists for a jet fuel filter element designed to withstand the pressure of the jet fuel surge so that the filter cartridges are not prematurely destroyed.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a jet fuel filter assembly. The jet fuel filter assembly comprises an elongated filter cartridge having a top, a bottom, a length extending from the top to the bottom, an exterior, an interior, and a diameter, and a filter element formed to fit within the filter cartridge at its bottom. The filter element comprises a hollow tube member having a top, a bottom, a length extending from the top to the bottom, an interior wall, an exterior wall, and a diameter less than the diameter of the filter cartridge. The filter element further comprises a plurality of flow vanes extending from the interior wall of the hollow tube member toward a center of the hollow tube member.

In another aspect, embodiments disclosed herein relate to a jet fuel filtration system. The jet fuel filtration system comprises a filter vessel, having a top and a bottom, formed to receive jet fuel at its bottom and a plurality of filter cartridges housed at the bottom of the filter vessel, each filter cartridge comprising a top, a bottom, a length extending from the top to the bottom, an exterior, an interior, and a diameter. Each filter cartridge is formed to filter the jet fuel as it travels from the filter vessel through the filter cartridge from the bottom of the filter cartridge to its top. The jet fuel filtration system further comprises a plurality of filter elements, each filter element formed to fit within a filter cartridge at its bottom. Each filter element comprises a hollow tube member having a top, a bottom, a length extending from the top to the bottom, an interior wall, an exterior wall, and a diameter less than the diameter of the filter cartridge. Each filter element further comprises a plurality of flow vanes extending from the interior wall of the hollow tube member toward a center of the hollow tube member.

Other aspects and advantages of the claimed subject matter will be apparent from the following description and the appended claims.

DETAILED DESCRIPTION

Figure 1:
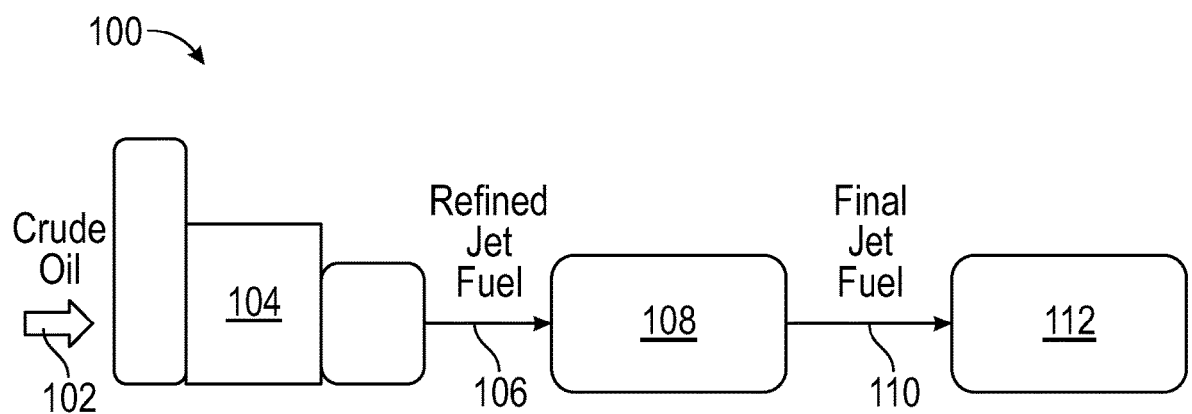
FIG. 1 illustrates a fuel distribution system according to embodiments of this disclosure.

In one aspect, embodiments disclosed herein relate to a filter element for use in a jet fuel filtration system, which may be a component of a jet fuel distribution system. FIG. 1 depicts one embodiment of a jet fuel distribution system (100). Crude oil (102) is converted into refined products at a refinery (104). As understood by one skilled in the art, the crude oil (102) goes through several processes to become refined final products, such as gasoline, refined jet fuel (106), and diesel. With regard to a jet fuel distribution system (100), the refined jet fuel (106) then travels (via pipeline or vehicle) to a filtering and separating unit (108). Following filtration and/or separation, the final jet fuel (110) is delivered to an airport supply location (112), which may include airport fuel storage, a fuel truck, or aircraft.

In one or more embodiments, the filtering and separating unit includes a jet fuel filtration system. The jet fuel filtration system (200), depicted in FIG. 2, functions to separate water from the refined jet fuel (106) to meet quality specifications prior to distribution of the final jet fuel (110) to aircraft. In one or more embodiments, the jet fuel filtration system (200) includes at least one filter housing, or filter vessel (202). The filter vessel (202) provides mechanical support for the filter elements, which may include filter cartridges (204), filter bags, strainer baskets, and other components. Additionally, the filter vessel (202) includes multiple sets of mounting hardware for mounting multiple filter cartridges. The filter vessel (202) may be connected with a storage tank, or unit. Filter cartridges (204) may be mounted in the filter vessel via a self-centering rod mount, a screw connection, or other attachment mechanism. In one or more embodiments, each set of mounting hardware includes a center rod (206) mounted to a bottom of the filter vessel (202), such that there are multiple center rods, one for each filter cartridge, extending from the bottom of the filter vessel toward a top of the filter vessel.

The filter cartridge (204) may be of a type used in bulk plants, which cleans the fuel before it is transferred to an airport. In one or more embodiments, the filter cartridge (204) is comprised of layers of fabric. The filter cartridge (204) has an interior region and an exterior region. In one or more embodiments, the interior region may include an aperture that extends the length of the filter cartridge (204). Each aperture may be sized and shaped to receive a center rod (206) of the mounting hardware in order to position and secure the filter cartridge within the filter vessel (202). As can be appreciated by one skilled in the art, the filter cartridges (204) may alternatively be coupled to the filter vessel (202) using a screw connection (or other attachment mechanism). Jet fuel (110) enters the filter vessel (202) from its bottom then travels through the filter cartridges (204). The entry point of the fuel in each filter cartridge is at the bottom of the filter cartridge (204). Often, the bottom part of the filter cartridge can't withstand the jet fuel surge and gets ruptured prematurely. Failure of jet fuel filter cartridges due to premature rupturing caused by a surge of jet fuel through the bottom of the filter cartridge has long been a problem in the industry. The filter element described herein is an improvement over existing fuel filter cartridges, specifically to the bottom portion of the interior of the filter cartridge to prevent premature rupturing, as described in detail below.

Figure 3A:
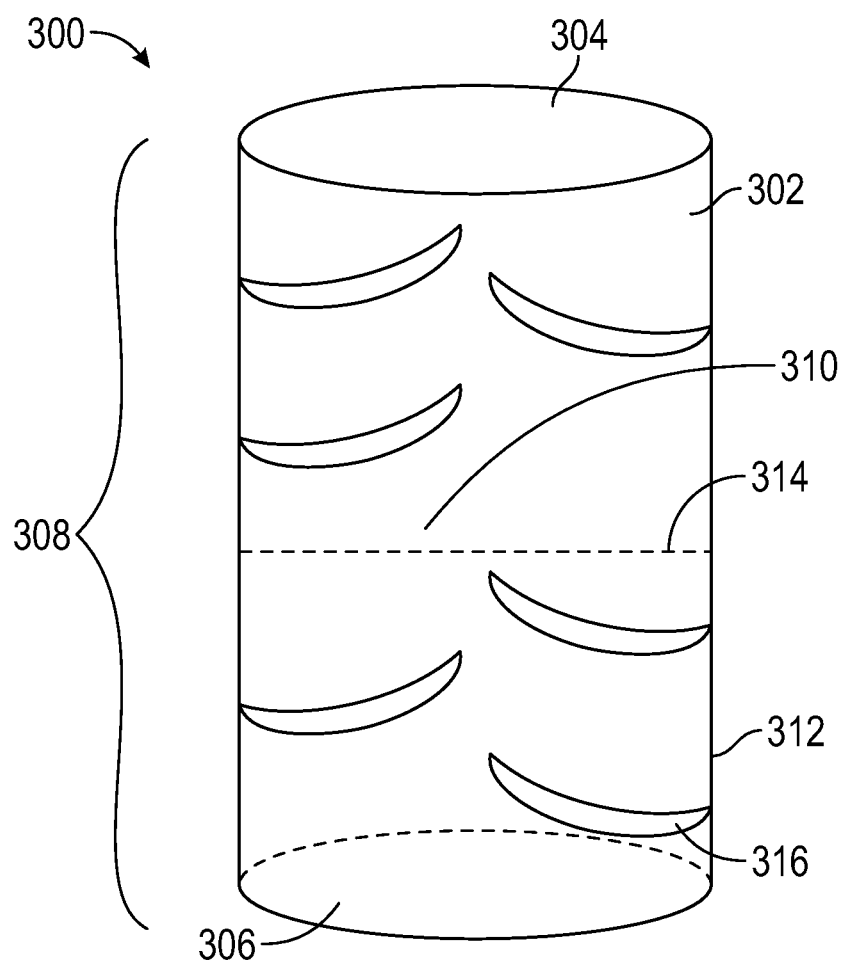
FIG. 3A illustrates a filter element according to embodiments of this disclosure.

FIG. 3A illustrates the filter element (300) according to embodiments of this disclosure. The filter element (300) includes a hollow tube member (302), having a top (304), a bottom (306), a length (308) extending from the top (304) to the bottom (306), an interior (310), an exterior (312), and a diameter (314). The hollow tube member (302) may be constructed from any durable material, such as plastic or metal, or any combination of materials. The hollow tube member (302) comprises a plurality of flow vanes (316) within its interior. The flow vanes (316) may be distributed along the length of the hollow tube member (302), as shown in FIG. 3A, or concentrated in one or more sections of the hollow tube member (302). In one or more embodiments, the flow vanes (316) are substantially wing-shaped (i.e., elongated wings), but can be of any suitable shape or size. Additionally, the flow vanes (316) may all be the same size, or various sizes.

Figure 3B:
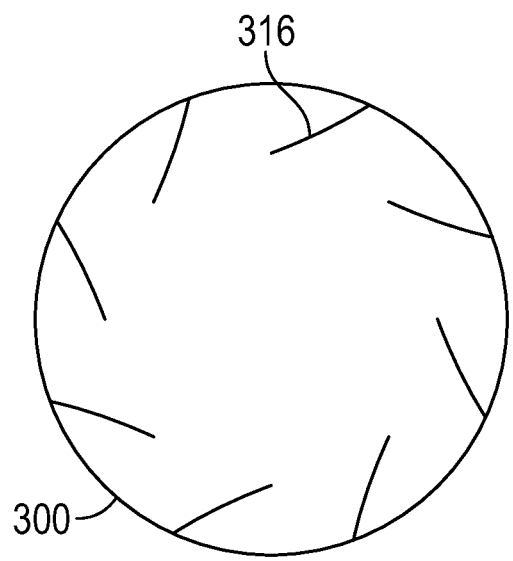
FIG. 3B illustrates a bottom-view of the filter element according to embodiments of this disclosure.

Furthermore, the flow vanes (316) may be molded as part of the hollow tube member (302) during manufacturing, or separately attached with the hollow tube member (302) during manufacturing via any suitable attachment mechanism (e.g., adhesive, metal fusion, screw mechanism). The flow vanes (316) may be formed of the same material as the hollow tube member (302) or formed from a different material (e.g., plastic, elastomeric material). In one or more embodiments, the flow vanes (316) are formed as part of the hollow tube member (302) and are formed from a flexible material that can bend and compress easily (e.g., rubber). FIG. 3B depicts a bottom-view illustration of the hollow tube member (302) with flow vanes (316). The purpose of the flow vanes (316) is described in detail below.

Figure 2:
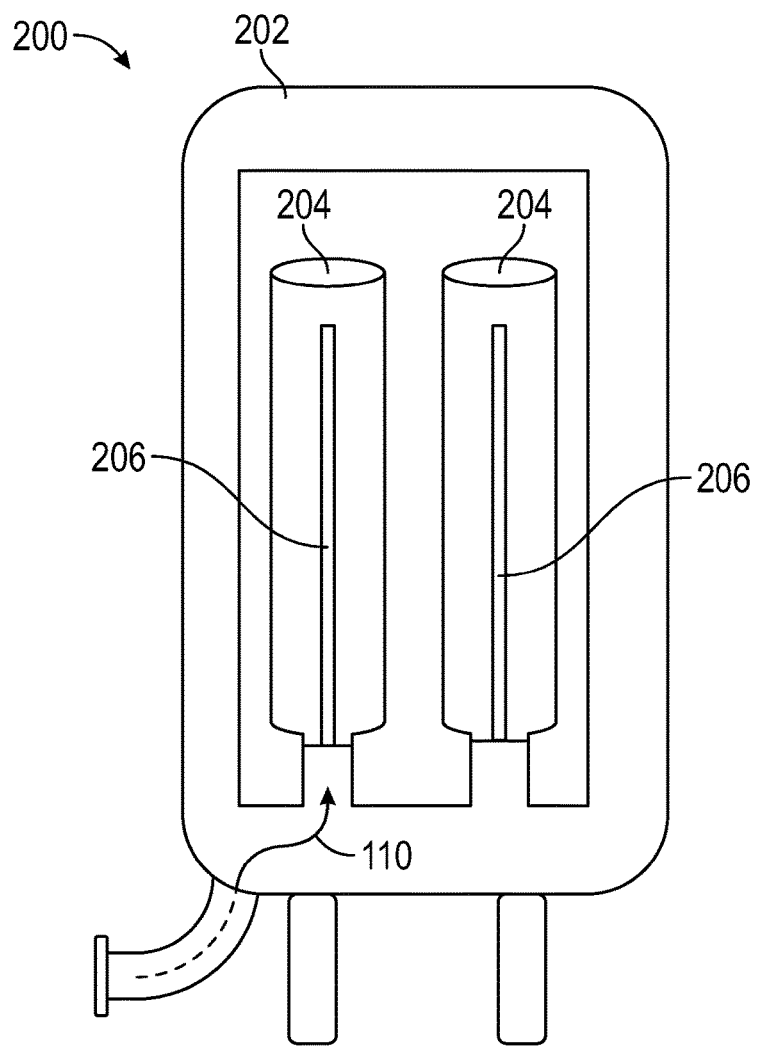
FIG. 2 illustrates a jet fuel filtration system according to embodiments of this disclosure.
Figure 4B:
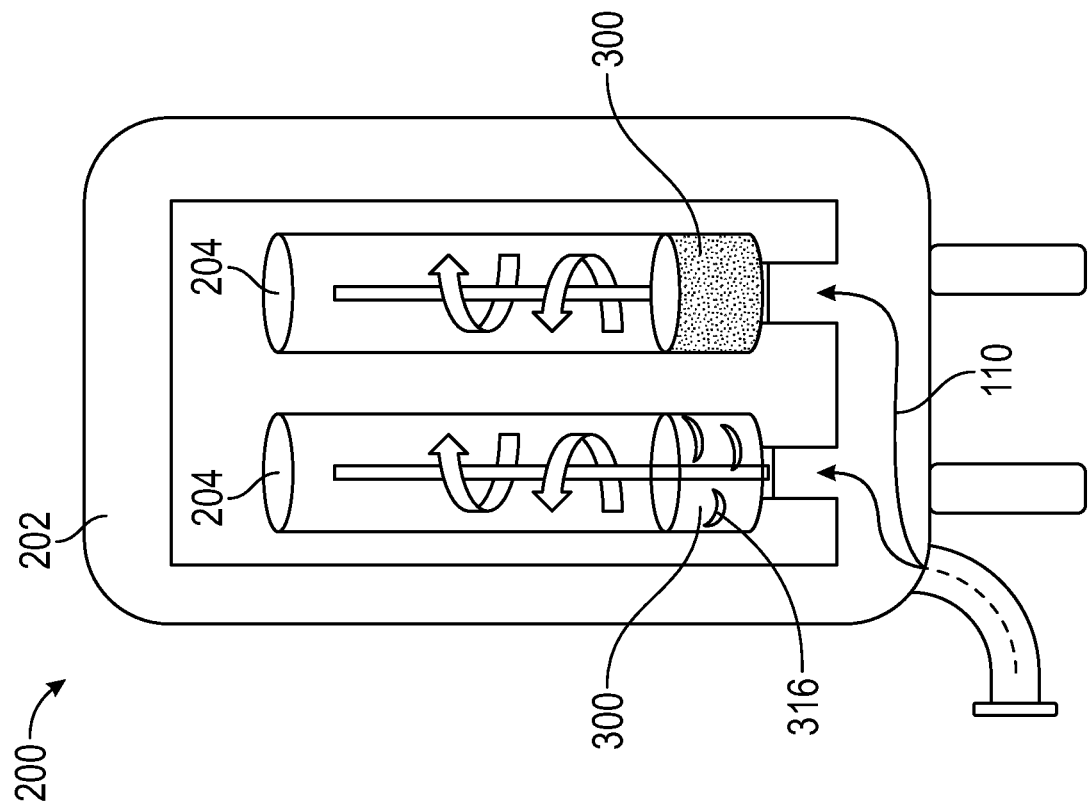
FIG. 4B illustrates the jet fuel filtration system and the filter element according to embodiments of this disclosure.
Figure 4A:
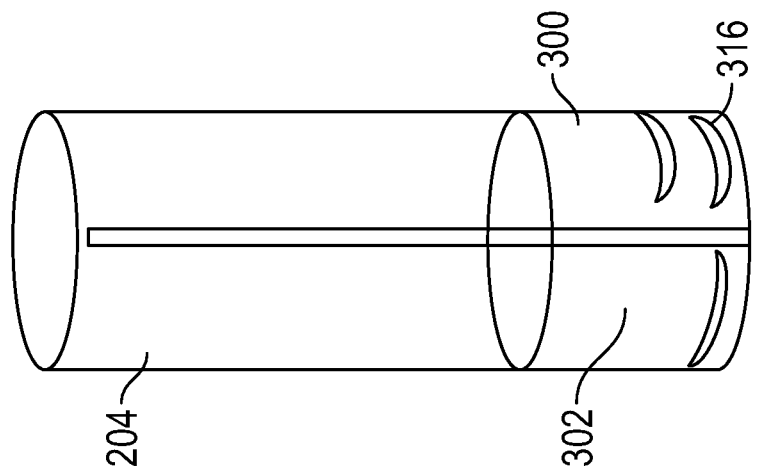
FIG. 4A illustrates the filter element within a filter cartridge according to embodiments of this disclosure.

FIG. 4A illustrates the filter element (300) positioned within the filter cartridge (204). The filter element (300) is positioned within a bottom region of the filter cartridge (204) also having a diameter, which is proximate the bottom of the filter vessel (as shown in FIG. 2). When properly positioned within the filter cartridge (204), the exterior of the filter element (300) is substantially aligned with the interior region of the filter cartridge (204). The diameter of the hollow tube member (302) is substantially similar to the diameter of the filter cartridge (204) such that, when the filter element (300) is positioned within the filter cartridge (204), there is only sufficient space between the exterior of the hollow tube member (302) and the interior of the filter cartridge (204) for the hollow tube member (302) to fit within the filter cartridge (204), not allowing any fluid to pass between the exterior of the hollow tube member (302) and the interior of the filter cartridge (204). In one embodiment, the filter element (300) is mechanically fit within the filter cartridge (204). However, in other embodiments, a bonding material, such as a silicone adhesive, may be utilized.

The hollow tube member (302) of the filter element (300) is sized such that its length extends from the bottom of the filter cartridge (204) to a length that is a portion of the length of the filter cartridge (204). In one embodiment, the length of the hollow tube member (302) is approximately twenty percent of the length of the filter cartridge (204) since premature rupture generally occurs in this region of the filter cartridge. A filter element (300) of this size is sufficient to create radial flow and alleviate the pressure of the jet fuel. However, as can be appreciated by one skilled in the art, the size of the filter element (300) can be optimized as needed depending on the filter cartridge (204) in which it is implemented. The filter element (300) physically blocks the pores of the material of the filter cartridge (204) in the area of the filter cartridge it resides in (i.e., the bottom area). The remaining areas of the filter cartridge (204) not reinforced with the filter element (300) are sufficient to clean the jet fuel.

FIG. 4B illustrates a jet fuel filtration system (200) implementing the filter element (300) described herein. The flow vanes (316) are shaped and positioned within the filter element (300) to direct the jet fuel (110) entering each filter cartridge (204) to spiral or follow a helical path through the filter element (300) and upward in the interior region of the filter cartridge (204). This spiral/helical motion prevents the normal fluid flow vector against the material (e.g., mesh) at the bottom of the filter cartridge (204), which often results in the premature rupturing of the material. Rather, the flow vanes (316) distribute the fluid flow force, in part, as a rotational force, and in part, parallel with the bottom material surface of the filter cartridge (204), which will force the jet fuel (110) (i.e., liquid phase) to take the inner shape of the filter cartridge (204), thereby reducing pressure. As the fluid flow reaches toward the top of the filter cartridge (204), the fluid flows through the filter cartridge (204) material and out into the filter vessel (202) at a reduced force compared to the typical fluid flow. The reduced force enabled by the filter element (300) described herein eliminates the repetitive and premature rupturing of the bottom part of the filter cartridge (204), thereby prolonging the service life of the filter cartridge.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:
1. A jet fuel filter assembly, comprising:
   an elongated filter cartridge having a top, a bottom, a length extending from the top to the bottom, an exterior, an interior, and a diameter, the filter cartridge comprising a material having a plurality of pores, the filter cartridge formed to separate water from jet fuel entering the bottom of the filter cartridge; and a filter element residing in only a bottom region of the filter cartridge, the filter element comprising:
- a hollow tube member comprised of a durable material having a top, a bottom, a length extending from the top to the bottom, an interior wall, an exterior wall, and a diameter less than the diameter of the filter cartridge; and
- a plurality of flow vanes extending from the interior wall of the hollow tube member toward a center of the hollow tube member,
- wherein the plurality of flow vanes are positioned within the filter element to direct the jet fuel entering the bottom of the filter cartridge in a helical path through the filter element and upward toward the top of the filter cartridge, thereby reducing pressure of the jet fuel as the jet fuel travels through the filter cartridge from the bottom of the filter cartridge to the top of the filter cartridge, wherein the durable material of the filter element is formed to physically block the plurality of pores in only the bottom region of the filter cartridge.

2. The jet fuel filter assembly as set forth in claim 1, wherein the length of the hollow tube member is less than the length of the filter cartridge.

3. The jet fuel filter assembly as set forth in claim 1, wherein each flow vane is substantially wing-shaped.

4. The jet fuel filter assembly as set forth in claim 1, wherein the plurality of flow vanes are positioned along the length of the hollow tube member.

5. The jet fuel filter assembly as set forth in claim 1, wherein the plurality of flow vanes are positioned proximate the bottom of the hollow tube member.

6. The jet fuel filter assembly as set forth in claim 1, wherein the plurality of flow vanes are positioned symmetrically around the center of the hollow tube member along the interior wall.

7. The jet fuel filter assembly as set forth in claim 1, wherein the plurality of flow vanes are comprised of a flexible material.

8. The jet fuel filter assembly as set forth in claim 2, wherein the length of the hollow tube member is less than half of the length of the filter cartridge.

9. A jet fuel filtration system, comprising:
- a filter vessel, having a top and a bottom, formed to receive jet fuel at the bottom;
- a plurality of filter cartridges housed at the bottom of the filter vessel,
- wherein each filter cartridge comprises a top, a bottom, a length extending from the top to the bottom, an exterior, an interior, and a diameter,
- wherein each filter cartridge is comprised of a material having a plurality of pores and is formed to filter the jet fuel as the jet fuel travels from the filter vessel through each filter cartridge from the bottom of each filter cartridge to the top of each filter cartridge; and
- a plurality of filter elements, each filter element formed to reside in only a bottom region of each filter cartridge,
- wherein each filter element comprises:
  - a hollow tube member comprised of a durable material having a top, a bottom, a length extending from the top to the bottom, an interior wall, an exterior wall, and a diameter less than the diameter of each filter cartridge; and
  - a plurality of flow vanes extending from the interior wall of the hollow tube member toward a center of the hollow tube member, wherein the durable material of each filter element is formed to physically block the plurality of pores in only the bottom region of each filter cartridge.

10. The jet fuel filtration system as set forth in claim 9, wherein the length of the hollow tube member is less than the length of each filter cartridge.

11. The jet fuel filtration system as set forth in claim 9, wherein each flow vane is substantially wing-shaped.

12. The jet fuel filtration system as set forth in claim 9, wherein the plurality of flow vanes are positioned along the length of the hollow tube member.

13. The jet fuel filtration system as set forth in claim 9, wherein the plurality of flow vanes are positioned proximate the bottom of the hollow tube member.

14. The jet fuel filtration system as set forth in claim 9, wherein the plurality of flow vanes are positioned symmetrically around the center of the hollow tube member along the interior wall.

15. The jet fuel filtration system as set forth in claim 9, wherein the plurality of flow vanes are comprised of a flexible material.

16. The jet fuel filtration system as set forth in claim 10, wherein the length of the hollow tube member is less than half of the length of each filter cartridge.

* * * * *